April 21, 1964     J. R. LUDWIG     3,129,570
CLUTCH DRIVEN MEMBER
Filed June 2, 1960
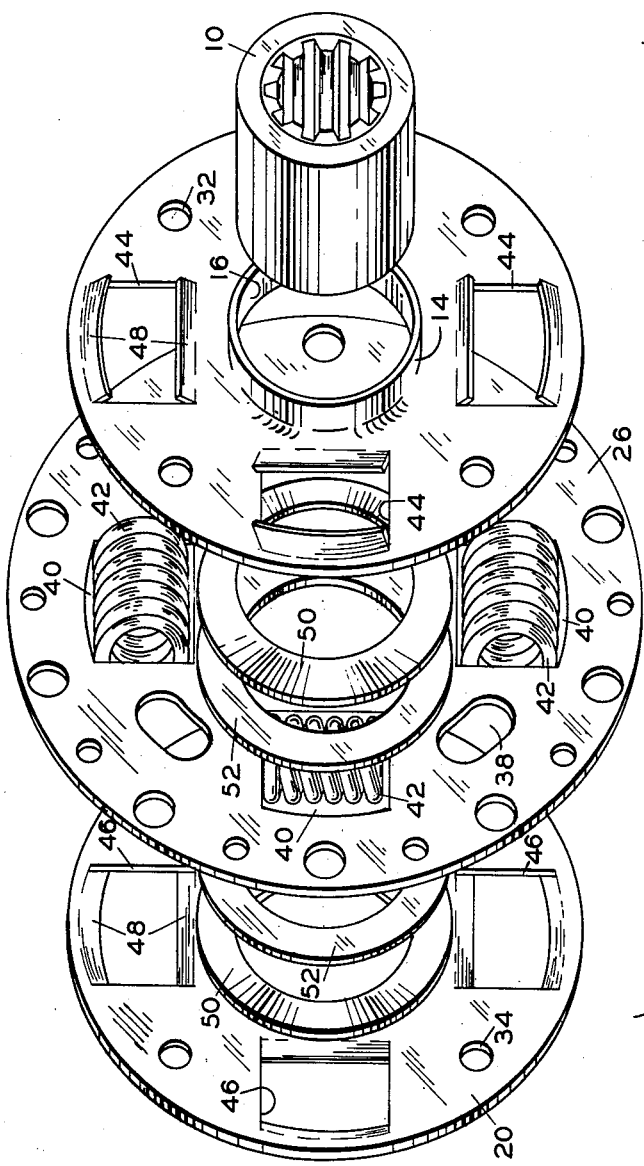
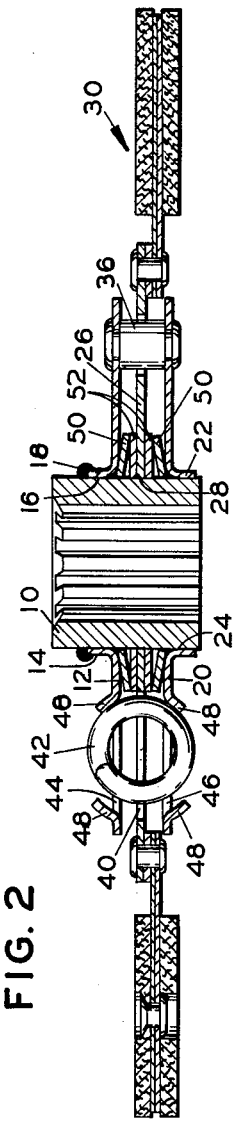
*INVENTOR.*
JOHN ROBERT LUDWIG
BY *Walter E. Pavlick*
ATTORNEY United States Patent Office 3,129,570
Patented Apr. 21, 1964

3,129,570
CLUTCH DRIVEN MEMBER
John R. Ludwig, Swanton, Ohio, assignor to Dana Corporation, Toledo, Ohio, a corporation of Virginia
Filed June 2, 1960, Ser. No. 33,411
7 Claims. (Cl. 64—23)

This invention relates to clutches in general and more particularly to the construction of a driven member of a clutch assembly.

An object of this invention is to eliminate the integral hub flange of a clutch driven member.

Another object of this invention is to provide a driven disk for a clutch which is movable relative to the hub member on which it is positioned to accommodate misalignment between the two.

A further object is to employ a driven member which provides a yieldable torque transmitting arrangement so that more efficient vibration dampening is attained.

A still further object is to provide a clutch driven member which is simple and inexpensive to construct, yet strong and durable.

Still another object is to provide a driven member which is easy to assemble and also easy to disassemble for replacement of parts.

Still other objects and advantages of this invention will be apparent from the following description and reference to the accompanying drawings in which:

FIG. 1 is a cross sectional view of a clutch driven member embodying this invention.

FIG. 2 is an exploded perspective view of certain of the components of the clutch.

In previous clutch driven member assemblies the hub was provided with an integral flange. To this flange, the cover plates and/or disk are riveted or otherwise fixedly attached. To provide the integral flange on the hub, the assembly had to be forged or cast and then the flange machined to finish dimensions. This is an expensive method of manufacture. In addition, the integral hub usually rigidly mounts the friction disk and any misalignment between the hub and the disk causing cocking of the disk results in unwarranted stressing of the disk when it is engaged with the flywheel by the pressure plate.

The present invention does not utilize an integral flange on the hub. As a result, the hub portion can be inexpensively machined from bar stock. In the present invention one of the cover plates of the driven member is welded at its flanged edge to the hub and serves the combined purpose of an integral flange and a cover plate. The other cover plate is not welded to the hub, but merely connected to the welded plate by spacer rivets. A disk with friction facing thereon is disposed between the cover plates, and Belleville or wave washers are interposed between the disk and the plates to resist rotary movement therebetween and yieldingly position the disk so that any misalignment relative to the hub is accommodated by the Belleville or wave washers. Since the second cover plate is not fixedly secured to the hub, mere removal of the spacer rivets permits removal of this cover plate for access to the disk and Belleville or wave washers so that they may be easily replaced.

Referring now to the drawings, in which the same reference numerals are used to indicate the same parts in all the views, and more specifically FIG. 1, wherein a splined hub is shown at 10. Preferably this hub 10 is manufactured from bar stock having substantially the same outside diameter as the finished part so as to maintain the material and processing cost at a minimum. An annular cover plate 12 is provided with an internal flange 14 thereon which defines a central opening 16. The cover plate 12 is disposed on the hub 10 as shown and fixedly attached thereto preferably by an annular weld 18. A second annular cover plate 20 having a flange 22 thereon defining a central opening 24 is disposed on the hub 10 for axial movement relative thereto. An annular disk 26 having a central opening 28 therein is also disposed on the hub 10 and positioned between the cover plates 12 and 20. The annular disk 26 is larger in diameter than cover plates 12 and 20 and is provided with conventional friction facing, indicated generally at 30 in FIG. 1, fixedly secured to the outer periphery thereof.

As shown in FIG. 2, cover plate 12 has four circumferentially spaced holes 32, and cover plate 20 has four corresponding circumferentially spaced holes 34. The two cover plates 12 and 20 are spaced apart and fixedly connected, as shown in FIG. 1, by spacer rivets 36 which are inserted in the holes 32 and 34. The annular disk 26 is provided with four elongated openings 38 through which the spacer rivets 36 extend. The elongated openings 38 are of such a length that limited relative rotation may occur between the annular disk 26 and the cover members 12 and 20.

The disk member 26 also is provided with four equally spaced apart openings or windows 40. A coil spring 42 is positioned in each of the windows 40 and normally engages each of the end walls thereof. The cover plates 12 and 20 are provided with openings 44 and 46, respectively, which correspond to the openings or windows 40 in the annular disk member 26. The cover members 12 and 20 are provided with arcuate flange portions 48 about their openings 44 and 46 to form pocket portions registering with the openings or windows 40 of the disk member and housing the coil springs 42. It is now apparent that upon rotation of the annular disk member 26, torque will be transmitted in the conventional manner through coil springs 42 to the cover plates 12 and 20.

To provide a yieldable torque transmitting arrangement and more efficient vibration dampening a pair of spacer washers 50 and a pair of annular friction members 52 are positioned around the hub 10 between the cover plates 12 and 20. A spacer washer 50 and an annular friction member 52 are positioned on each side of the annular disk member 26 and tend to resist relative rotation between the disk and the cover plates 12 and 20.

In operation the friction facing 30 is adapted to be compressed against a flywheel (not shown) by a pressure plate (not shown) to cause rotation of the annular disk member 26. This rotation is transferred resiliently through coil springs 42 to the cover members 12 and 20, to the hub member 10, and subsequently to a power shaft (not shown) splined to the hub. The annular friction members 52 resist relative rotation of the annular disk 26 and the cover plates 12 and 20 to dampen vibrations in the power transmission system. Furthermore, should there be misalignment between the disk 26 and the hub 10, when the pressure plate first engages the disk 26, yielding of the annular resilient friction members 52 will correct such misalignment or cocking of the disk and the disk will be compressed squarely against the flywheel without unnecessarily stressing the disk.

Should the friction facing 30, annular friction members 52 or other component parts become worn and need replacement, since cover plates 12 and 20 are connected to the hub 10 by the annular weld 18, access is gained to these parts merely by removing the spacer rivets 36 and sliding the cover member 20 off the hub 10. In this manner the clutch driven member may be easily serviced.

From the foregoing, it is now apparent that a clutch driven member construction has been described which will fulfill the objects of the invention. The preferred embodiment of the invention has been illustrated and described, but changes and modifications can be made, and it is understood that this showing and description is illustrative only and not for the purpose of rendering my invention as limited to the detail illustrated or described, except insofar as I have limited them by the terms of the following claims.

What I claim is:

1. In a clutch member the combination comprising a pair of plates each having a central opening, a hub member disposed in said central openings, a disk rotatably mounted on said hub member between said plates and extending radially outwardly beyond the periphery thereof, means rigidly securing at least one of said plates to said hub member, means securing said plates to each other in spaced apart relationship, and means disposed on said hub yieldably positioning said disk relative to said plates.

2. In a clutch member the combination comprising a pair of plates each having a central opening, a hub member having a projection-free, substantially regular external surface disposed in said central openings, a disk rotatably mounted on said hub member between said plates and extending radially outwardly beyond the periphery thereof, means rigidly securing at least one of said plates to said hub member, means securing said plates to each other in spaced apart relationship, and axially yieldable means disposed between each of said plates and said disk for yieldably positioning said disk axially relative to said hub.

3. In a clutch member the combination comprising a pair of plates each having means defining a central opening, a cylindrical hub member having a substantially uniform external diameter throughout and being disposed in said central openings, a disk rotatably mounted on said hub member between said plates and extending radially outwardly beyond the periphery thereof, friction means carried by said disk on the portion thereof extending beyond said plates, means defining elongated openings in said plates and said disk, resilient means disposed in said openings drivingly connecting said disk and said plates, means rigidly connecting at least one of said plates to said hub member, means connecting said plates to each other in spaced apart relationship, and annular resilient friction members disposed on said hub between each of said plates and said disk whereby said annular disk is movable relative to said hub member against the bias of said annular resilient friction members to accommodate misalignment between said hub member and said disk.

4. In a rotary torque transmitting element the combination comprising a pair of plates adapted to have a relatively rotatable disk member disposed therebetween and each having a central opening, and a hub having a projection and depression-free, substantially regular external surface and being disposed in said central openings, at least one of said plates being fixedly attached to said hub, and the other of said plates being spaced from and fixedly connected to said one plate.

5. In a rotary torque transmitting element the combination comprising a pair of plates adapted to have a relatively rotatable disk member disposed therebetween and each having a central opening, and a hub having a projection and depression free substantially cylindrical uniform outer surface and being disposed in said central openings, at least one of said plates being fixedly attached to said hub, and the other of said plates being spaced from and fixedly connected to said one plate.

6. In a rotary torque transmitting element the combination comprising a pair of plates each having a central opening, a cylindrical hub member having a substantially cylindrical uniform external diameter throughout and being disposed in said central openings, one of said plates being rigidly secured to said hub member, means connecting said plates together in spaced apart relationship, and the other of said plates being freely movable relative to said hub member upon being disconnected from said one plate so that said other plate may easily be removed to replace the components adapted to be positioned between said plates.

7. In a rotary torque transmitting element the combination comprising a hub having a splined bore, first and second plates adapted to have a friction disk disposed therebetween and each having a flanged portion thereon defining a central opening, said hub having a projection-free substantially regular external surface and being disposed in said central openings, means connecting the flange of said first plate to said hub, spacer rivets for interconnecting said first and second plates, and said second plate being spaced from the first plate and having the flanged portion thereof freely movable relative to said hub when said second plate is disconnected from said first plate whereby said second plate may be easily removed to replace the friction disk.

References Cited in the file of this patent

UNITED STATES PATENTS

| 1,952,892 | Reed | Mar. 27, 1934 |
| 2,127,996 | Havill | Aug. 23, 1938 |
| 2,176,696 | Wemp | Oct. 17, 1939 |
| 2,276,416 | Nutt | Mar. 17, 1942 |
| 2,521,138 | Waller | Sept. 5, 1950 |
| 2,636,363 | Nutt | Apr. 28, 1953 |

FOREIGN PATENTS

| 718,652 | Germany | Mar. 17, 1942 |